United States Patent
Tseng et al.

(10) Patent No.: US 8,174,662 B2
(45) Date of Patent: May 8, 2012

(54) DISPLAY CIRCUITS

(75) Inventors: I-Hung Tseng, Tainan (TW); Jung-Mao Tsai, Gangshan Township, Kaohsiung County (TW)

(73) Assignee: Au Optronics Corp., Hsinchu (TW)

( * ) Notice: Subject to any disclaimer, the term of this patent is extended or adjusted under 35 U.S.C. 154(b) by 0 days.

(21) Appl. No.: 12/904,668

(22) Filed: Oct. 14, 2010

(65) Prior Publication Data
US 2011/0025972 A1 Feb. 3, 2011

Related U.S. Application Data

(62) Division of application No. 11/463,607, filed on Aug. 10, 2006, now Pat. No. 7,834,972.

(30) Foreign Application Priority Data

Mar. 15, 2006 (TW) .............................. 95108691 A

(51) Int. Cl.
*G02F 1/1345* (2006.01)
(52) U.S. Cl. ........................................ 349/149; 324/538
(58) Field of Classification Search .................. None
See application file for complete search history.

(56) References Cited

U.S. PATENT DOCUMENTS

| | | | |
|---|---|---|---|
| 5,945,984 A | 8/1999 | Kuwashiro | |
| 6,091,475 A * | 7/2000 | Ogino et al. | 349/149 |
| 6,906,544 B1 | 6/2005 | Shanker et al. | |
| 2004/0012554 A1 | 1/2004 | Song et al. | |
| 2004/0095549 A1 * | 5/2004 | Moon | 349/192 |
| 2004/0196025 A1 | 10/2004 | Casey et al. | |
| 2005/0242830 A1 | 11/2005 | Humphrey et al. | |

FOREIGN PATENT DOCUMENTS

| | | |
|---|---|---|
| CN | 1503040 | 6/2004 |
| JP | 2004095872 | 3/2004 |
| TW | 230259 | 4/2005 |

* cited by examiner

*Primary Examiner* — Lucy Chien
(74) *Attorney, Agent, or Firm* — Thomas|Kayden

(57) ABSTRACT

A display circuit for a display panel is disclosed. The display circuit comprises a circuit board, a flexible printed circuit board (FPC), and a driver. The circuit board has at least one test pad. The flexible printed circuit board is electrically connected and disposed between the circuit board and the display panel. The driver is disposed on the flexible printed circuit board and has at least one test pin. The at least one test pin is electrically connected to the at least one test pad.

5 Claims, 6 Drawing Sheets

DISPLAY CIRCUITS

CROSS REFERENCE TO RELATED APPLICATIONS

This application is a Divisional of Application No. 11/463,607, filed Aug. 10, 2006 (now U.S. Pat. No. 7,834,972), which claims priority to Taiwanese Application No. 95108691, filed Mar. 15, 2006, the entirety of which is incorporated herein.

BACKGROUND OF THE INVENTION

1. Field of the Invention

The present invention relates to a test pad circuit, and in particular relates to a display circuit having a test pad on a glass substrate or a system circuit board.

2. Description of the Related Art

Generally, a liquid crystal display device comprises a display penal, a plurality of drivers, and a system circuit board. The display panel is typically a glass substrate. The plurality of drivers comprises a scan driver and a data driver for controlling display units of the display units. There are two kinds of connection between the drivers and the display panel: Chip-On-Film (COF) and Chip-On-Glass (COG). In COG bonding, chips are bonded on a flexible printed circuit board (FPC), in other words, the drivers are directly disposed on a film of the FPC, and the FPC is electrically connected between the display panel and system circuit board. In COG bonding, chips are bonded on the glass substrate, in other words, the drivers are directly disposed on the display panel.

Each driver has a plurality of output pins, and the first and last pins always serve as test pins. In COF bonding, test pads for the test pins are always formed on the bottom surface of the FPC. The FPC must be turned over during test operations of the drivers, thus, test time is increased. In COG bonding, no test pad is formed on the ass substrate. Because the drivers are directly bonded on the glass substrate, a probe station is required to measure output waveforms of the drivers during the test operations of the drivers. Wires on the glass substrate are scraped and damaged by the probe, however, and analysis time is longer.

BRIEF SUMMARY OF THE INVENTION

An exemplary embodiment of a display circuit for a display panel comprises a circuit board, a flexible printed circuit board (FPC), and a driver. The circuit board has at least one test pad. The flexible printed circuit board is electrically connected and disposed between the circuit board and the display panel. The driver is disposed on the flexible printed circuit board and has at least one test pin. The at least one test pin is electrically connected to the at least one test pad.

An exemplary embodiment of a display circuit comprises a circuit board, a glass substrate, a flexible printed circuit board, and a driver. The circuit board has at least one test pad. The flexible printed circuit board is electrically connected and disposed between the circuit board and the glass substrate. The driver is disposed on the glass substrate and has at least one test pin. The at least one test pin is electrically connected to the at least one test pad through the flexible printed circuit board.

An exemplary embodiment of a display circuit comprises a glass substrate and a driver. The glass substrate has at least one test pad. The driver is disposed on the glass substrate and has at least one test pin. The at least one test pin is electrically connected to the at least one test pad.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
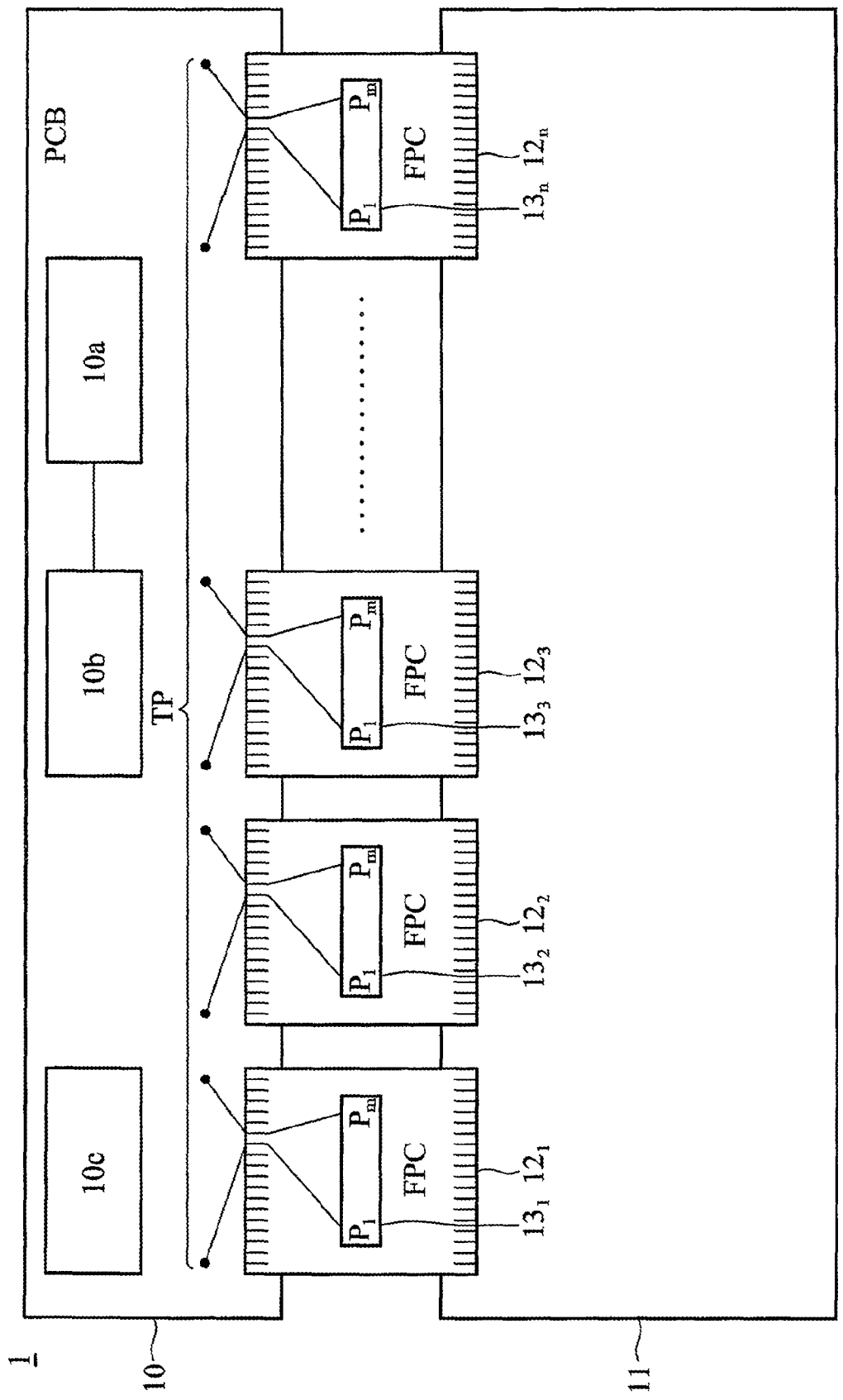
FIG. 1 depicts an exemplary embodiment of a display circuit.

The following description is of the best-contemplated mode of carrying out the invention. This description is made for the purpose of illustrating the general principles of the invention and should not be taken in a limiting sense. The scope of the invention is best determined by reference to the appended claims.

Display circuits are provided. In an exemplary embodiment of a display circuit in FIG. 1, a display circuit 1 comprises a printed circuit board (PCB) 10, a display panel 11, and at least one flexible printed circuit board (FPC) 12. In this embodiment, n FPCs $12_1$ to $12_n$ are given as an example. The FPCs $12_1$ to $12_n$ are electrically connected and disposed between the PCB 10 and the display panel 11. The PCB 10 has a plurality of test pads TP and comprises a timing controller 10a, a scalar 10b, and a power control unit 10c. The display panel 11 is formed by a glass substrate and comprises a plurality of display units.

The display circuit 1 further comprises at least one driver 13 controlling the display units of the display panel 11. In this embodiment, n drivers $13_1$ to $13_n$ are given as an example. The drivers $13_1$ to $13_n$ are respectively disposed on the FPCs $12_1$ to $12_n$. Each driver has a plurality of signal output pins $P_1$ to $P_m$, and at least one among the pins $P_1$ to $P_m$ serves as a test pin. In this embodiment, the first pin $P_1$ and the last pin $P_m$ serve as test pins. The first pin $P_1$ and the last pin $P_m$ of each driver are electrically connected to the corresponding test pads TP respectively.

Figure 2:
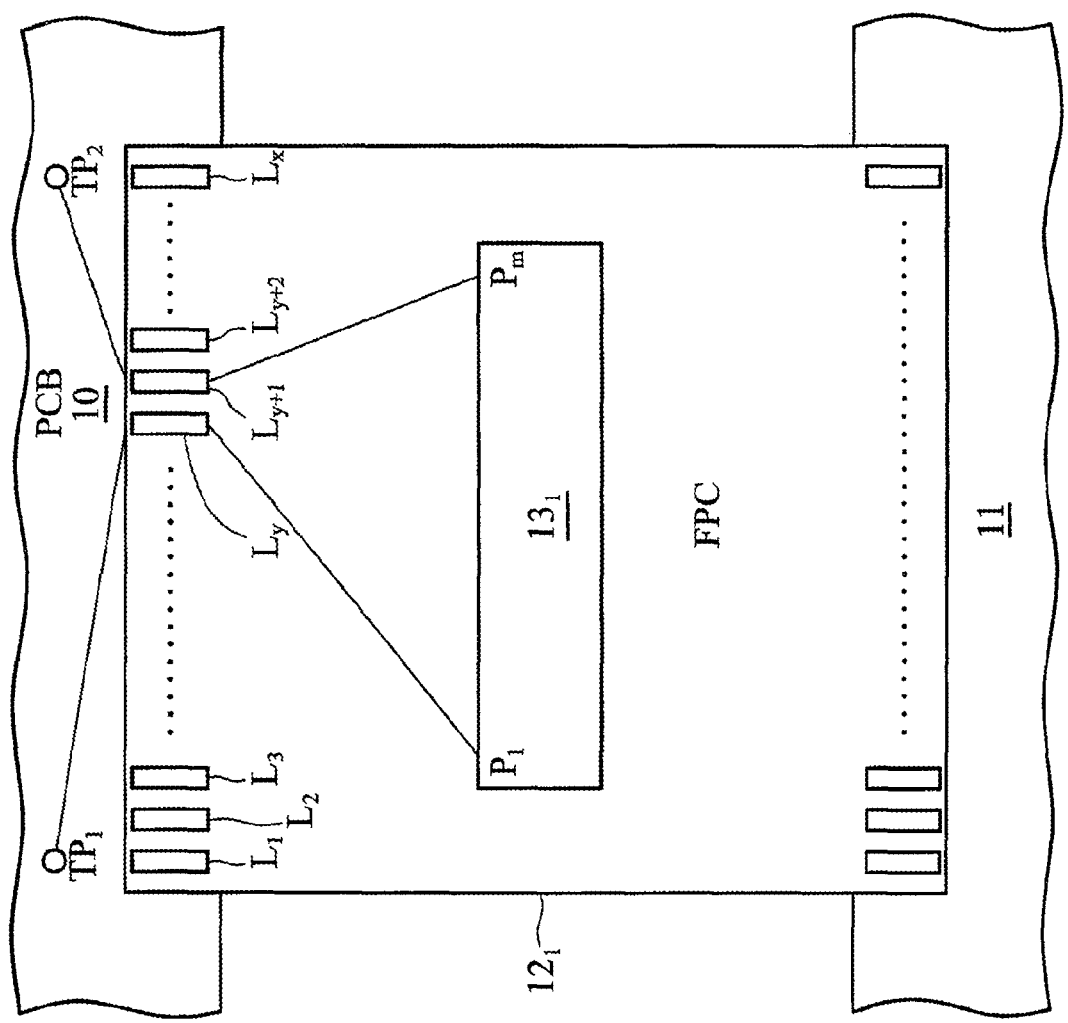
FIG. 2 is detailed diagram of the display circuit in FIG. 1.

FIG. 2 is detailed diagram of the display circuit 1. In FIG. 2, driver $13_1$ is given as an example, and the driver $13_1$ has first pin $P_1$ and the last pin $P_m$ serving as test pins. Referring to FIG. 2, the driver $13_1$ is disposed on the FPC $12_1$, and the FPC $12_1$ is electrically connected between the PCB 10 and the display panel 11. There are a plurality of bonding pads $L_1$ to $L_x$ on one side of the FPC $12_1$, on which the FPC $12_1$ is electrically connected to the PCB 10. At least one bonding pad serves as a dummy pad. Since the driver $13_1$ has two test pins $P_1$ and $P_m$, at least two dummy pads are used. Referring to FIG. 2, the first pin $P_1$ and the last pin $P_m$ of the driver $13_1$ electrically connected to the dummy pads $L_y$ and $L_{y+1}$, and the dummy pads $L_y$ and $L_{y+1}$ are electrically connected to the test pads $TP_1$ and $TP_2$ of the PCB 10, respectively.

According to the embodiment of FIG. 1, when the driver 13 is electrically connected to the display panel 11 by COF bonding, output signals of the driver 13 can be measured through the test pads $TP_1$ and $TP_2$ of the PCB 10 during test operations of the driver 13, and the FPC 12 is not turned over.

In the embodiment of FIG. 1, the driver 13 can be a scan driver or a data driver. The number of test pins of the driver can be determined according to system requirements, and the number of test pads is determined according to the number of test pins. The number of dummy pads is just enough for the test pins, in other words, some of dummy pads are used for the test pins, and some are used for other pins.

Figure 3:
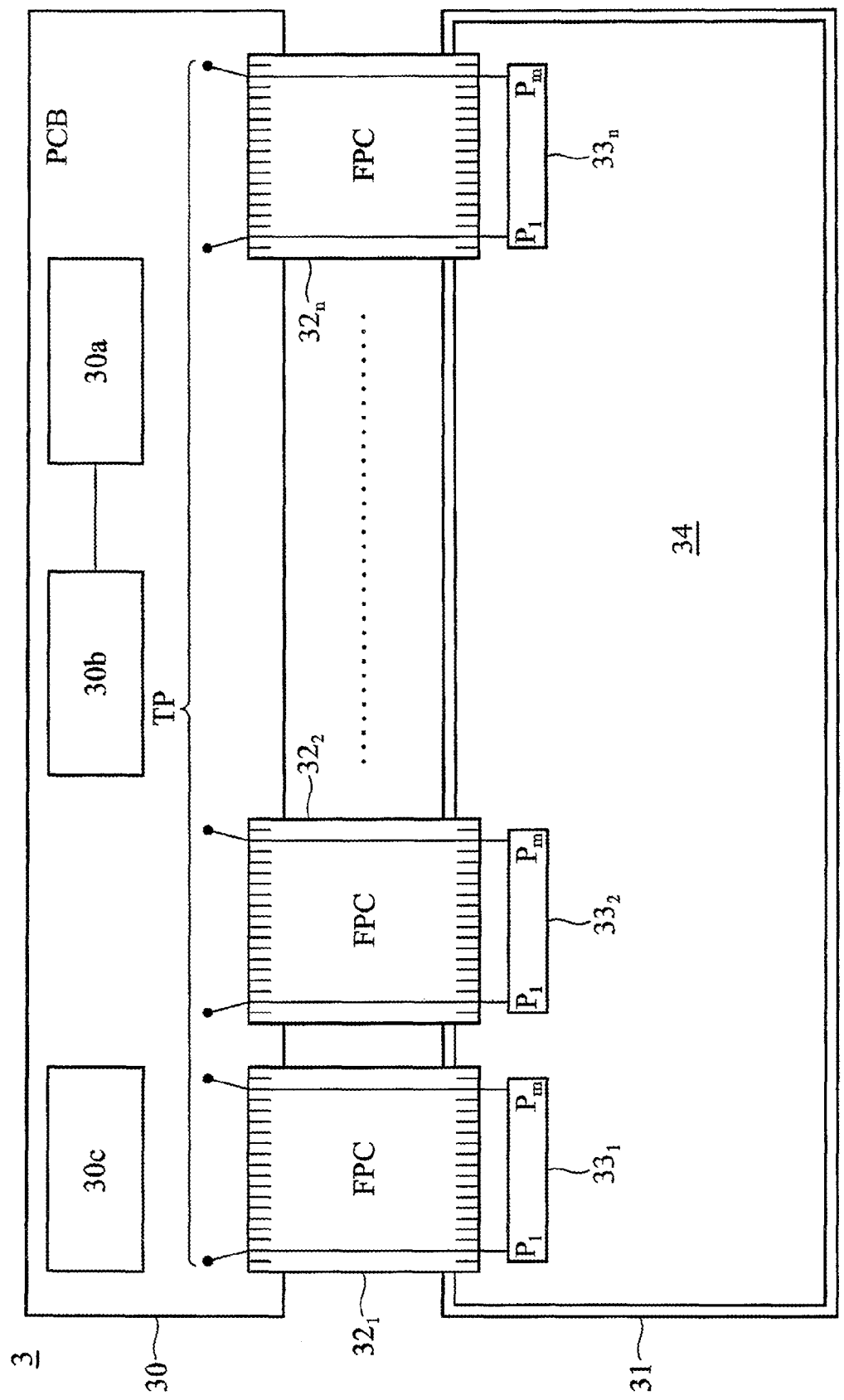
FIG. 3 depicts an exemplary embodiment of a display circuit.

In an exemplary embodiment of a display circuit in FIG. 3, a display circuit 3 comprises a printed circuit board (PCB) 30, a display panel 31, and at least one flexible printed circuit board (FPC) 32. In this embodiment, n FPCs $32_1$ to $32_n$ are taken as an example. The FPCs $32_1$ to $32_n$ are electrically connected and disposed between the PCB 30 and the display panel 31. The PCB 30 has a plurality of test pads TP and comprises a timing controller 30a, a scalar 30b, and a power control unit 30c. The display panel 31 is formed by a glass substrate 34 and comprises a plurality of display units.

The display circuit 3 further comprises at least one driver 33 controlling the display units of the display panel 31. In this embodiment, n drivers $33_1$ to $33_n$ are given as an example. The drivers $33_1$ to $33_n$ are disposed on the glass substrate 34. Each driver has a plurality of signal output pins $P_1$ to $P_m$, and at least one of the pins $P_1$ to $P_m$ serves as a test pin. In this embodiment, the first pin $P_1$ and the last pin $P_m$ serve as test pins. The first pin $P_1$ and the last pin $P_m$ of each driver are electrically connected to the corresponding test pads TP respectively.

Figure 4:
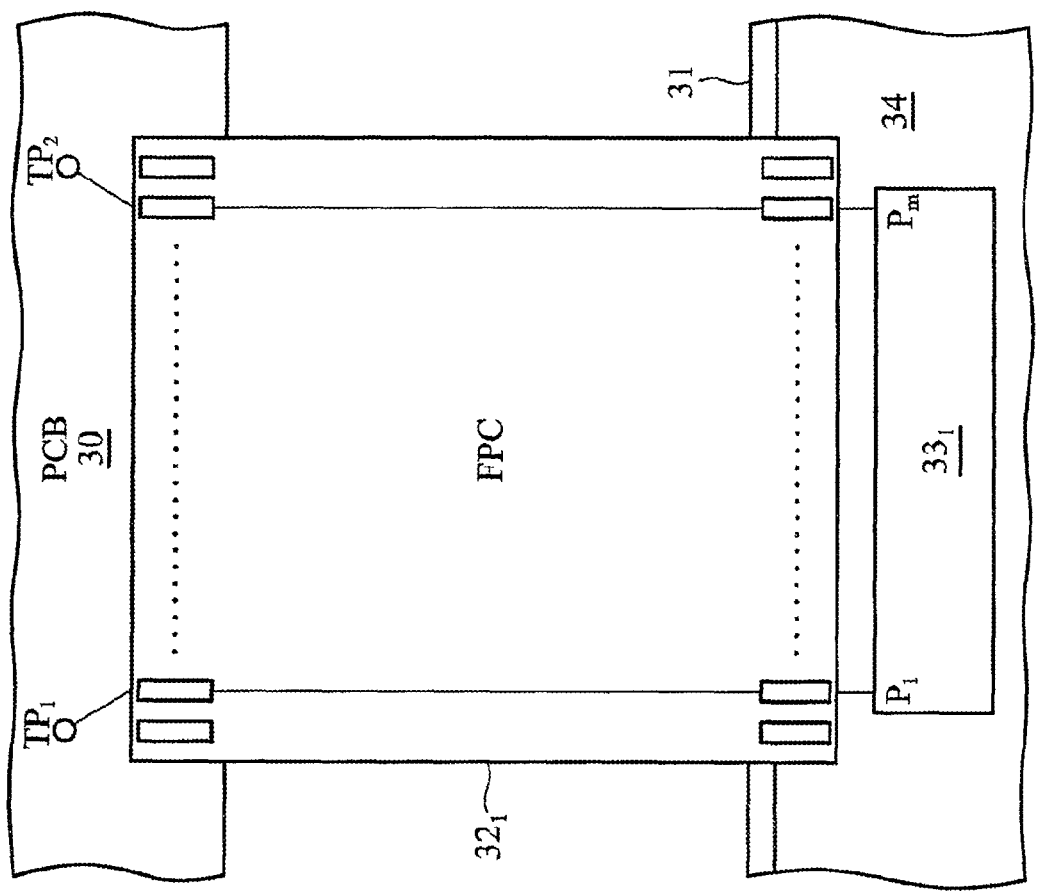
FIG. 4 is detailed diagram of the display circuit in FIG. 3.

FIG. 4 shows a detailed diagram of the display circuit 3. In FIG. 4, the driver $33_1$ given as an example, and the driver $33_1$ has first pin $P_1$ and the last pin $P_m$ serving as test pins. Referring to FIG. 4, the driver $13_1$ is disposed on the glass substrate 34 and electrically connected to the PCB 30 through the FPC $32_1$. The first pin $P_1$ and the last pin $P_m$ of the driver $33_1$ electrically connected to the test pads $TP_1$ and $TP_2$ of the PCB 30 respectively through the FPC $32_1$.

According to the embodiment of FIG. 3, when the driver 33 is electrically connected to the display panel 31 by COF bonding, output signals of the driver 33 can be measured through the test pads $TP_1$ and $TP_2$ of the PCB 30 in test operations of the driver 33, and the FPC 32 is not turned over.

In the embodiment of FIG. 3, the driver 33 can be a scan driver or a data driver. The number of test pins of the driver can be determined according to system requirements, and the number of test pads is determined according to the number of test pins.

Figure 5:
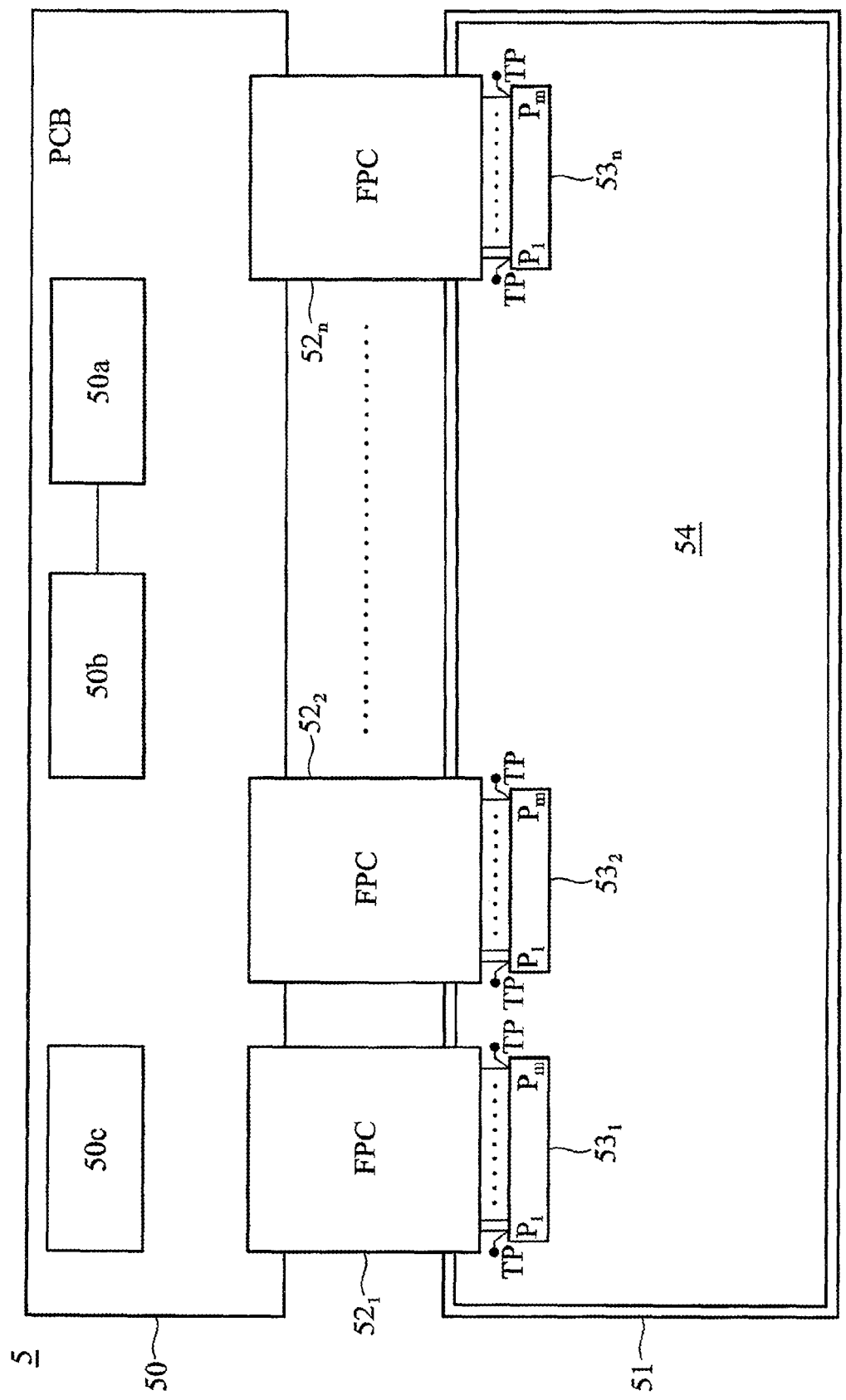
FIG. 5 depicts an exemplary embodiment of a display circuit.

In an exemplary embodiment of a display circuit in FIG. 5, a display circuit 5 comprises a printed circuit board (PCB) 50, a display panel 51, and at least one flexible printed circuit board (FPC) 52. In this embodiment, n FPCs $52_1$ to $52_n$ are given as an example. The FPCs $52_1$ to $52_n$ electrically connected and disposed between the PCB 50 and the display panel 51. The PCB 50 has a plurality of test pads TP and comprises a timing controller 50a, a scalar 50b, and a power control unit 50c. The display panel 51 is formed by a glass substrate 54 and comprises a plurality of display units. The glass substrate 54 has a plurality of test pads TP.

The display circuit 5 further comprises at least one driver 53 controlling the display units of the display panel 51. In this embodiment, n drivers $53_1$ to $53_n$ are given as an example. The drivers $53_1$ to $53_n$ are disposed on one side of the glass substrate 54. Each driver has a plurality of signal output pins $P_1$ to $P_m$, and at least one among the pins $P_1$ to $P_m$, serves as a test pin. In this embodiment, the first pin $P_1$ and the last pin $P_m$ serve as test pins. The first pin $P_1$ and the last pin $P_m$ of each driver are electrically connected to the corresponding test pads TP respectively.

Figure 6:
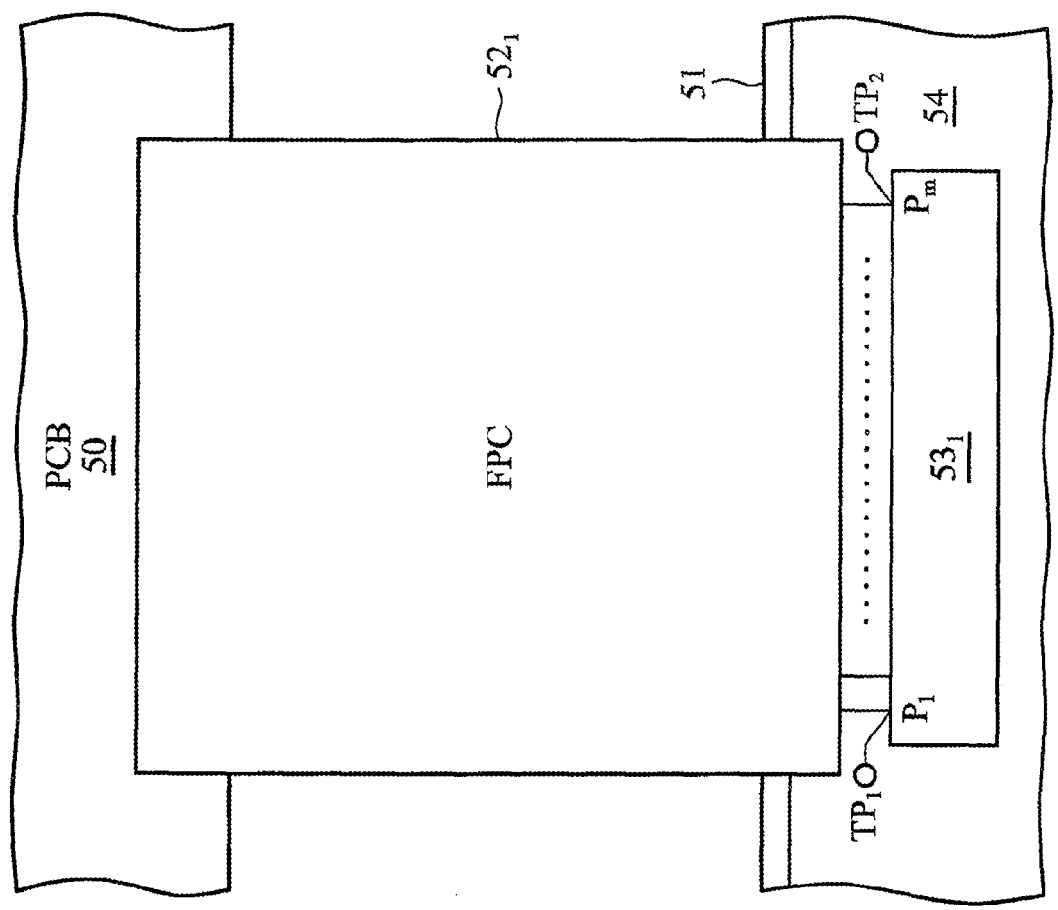
FIG. 6 is detailed diagram of the display circuit in FIG. 5.

FIG. 6 shows a detailed diagram of the display circuit 5. In FIG. 6, the driver $53_1$ given as an example, and the driver $63_1$ has first pin $P_1$ and the last pin $P_m$ serving as test pins. Referring to FIG. 6, the driver $53_1$ is disposed on the glass substrate 54 and electrically connected to the PCB 50 through the FPC $52_1$. The first pin $P_1$ and the last pin $P_m$ of the driver $33_1$ are electrically connected to the test pads $TP_1$ and $TP_2$ of the glass substrate 54 respectively.

According to the embodiment of FIG. 6, when the driver 53 is electrically connected to the display panel 51 by COG bonding, output signals of the driver 53 can be measured through the test pads $TP_1$ and $TP_2$ of the glass substrate 34 in test operations of the driver 53, thus, wires on the glass substrate 54 are not scraped and subsequently damaged by probes.

In the embodiment of FIG. 5, the driver 53 can be a scan driver or a data driver. The number of test pins of the driver can be determined according to system requirements, and the number of test pads is determined according to the number of test pins.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display circuit, comprising:
   a circuit board having at least one test pad;
   a glass substrate;
   a flexible printed circuit board electrically connected to and disposed between the circuit board and the glass substrate; and
   a driver disposed on the glass substrate and having at least one test pin, wherein the at least one test pin is electrically connected to the at least one test pad through the flexible printed circuit board.

2. The display circuit as claimed in claim 1, wherein the driver comprises a data driver.

3. The display circuit as claimed in claim 1, wherein the driver comprises a scan driver.

4. The display circuit as claimed in claim 1, wherein the at least one test pad is configured to measure output signals of the driver.

5. The display circuit as claimed in claim 1, wherein the circuit board comprises a timing controller, a scalar, and a power control unit.

* * * * *